Patented Feb. 27, 1945

2,370,567

UNITED STATES PATENT OFFICE 2,370,567

PREPARATION OF CARBONIC ACID ESTERS

Irving E. Muskat and Franklin Strain, Akron, Ohio, assignors to Pittsburgh Plate Glass Company, Allegheny County, Pa., a corporation of Pennsylvania No Drawing. Application March 28, 1941,
Serial No. 385,773

7 Claims. (Cl. 260—463)

This invention relates to the production of complex esters. In accordance with the present invention, unsaturated esters of carbonic acid are prepared by reaction of an unsaturated haloformate with a polyhydroxy compound.

The invention is particularly related to the production of esters from chloroformates of unsaturated alcohols containing up to 10 carbon atoms such as allyl, methallyl, isopropenyl, methyl vinyl carbinyl, crotyl, isocrotyl, cinnamyl, 2-chlorallyl, 2-bromoallyl, chlorocrotyl, bromocrotyl, butadienyl, propargyl or tiglyl chloroformate. However, esters may be prepared by use of chloroformates of higher alcohols such as oleyl or ricinoleyl chloroformates or the chloroformates of unsaturated alcohols derived by reduction of China-wood or coconut oil acids.

In the production of carbonic acid esters, various polyhydroxy compounds may be treated. Thus, alkylene glycols such as ethylene glycol, propylene glycol, butylene glycol, isobutylene glycol, trimethylene glycol, tetramethylene glycol, pentamethylene glycol, hexamethylene glycol, octamethylene glycol, alpha methyl tetramethylene glycol or the corresponding polyglycols such as di-, tri-, or tetraethylene glycol, di-, tri-, or tetrapropylene glycol, or the butylene polyglycols or other polyhydric alcohols or polyhydroxy compounds, such as glycerol, methyl glycerol, erythritol, pentaerythritol, glyceric acid, diglycerin, triglycerin, cellulose monoacetate, cellulose diacetate, ethylcellulose, cellulose hydrate, starch, sucrose or other carbohydrate, mannitol, sorbitol, polyvinyl alcohol, polyallyl alcohol, resorcinol, pyrogallol, hydroquinone, pyrocatechol, phthalyl alcohol, 1,4 - dehydrocyclohexane, hexahydroxy benzene, polyhydroxy esters such as ethylene glycol monolactate, propylene glycol monoglycolate, triethanolamine, diethanolamine, glycol dilactate, castor oil, or other polyhydroxy vegetable oil, glycol or glycerol polyglycolate, polyhydroxy butyrate or polysalicylate, halohydrins such as glycerol monochlorhydrin may be treated with the chloroformates specified above to form the corresponding carbonic acid esters. Thus, when allyl chloroformate is reacted with ethylene glycol the ester ethylene glycol bis (allyl carbonate) is formed. The reaction is generally conducted in the presence of a suitable alkaline agent such as pyridine, dimethyl aniline, quaternary ammonium bases, carbonates, bicarbonates or hydroxides of alkali or earth alkali metals such as sodium, potassium, calcium, barium, strontium, magnesium, etc. The temperature of reaction may be at room temperature (15°–25° C.) or it may be maintained at a lower temperature by artificial cooling. Under some circumstances heat may be applied. The temperature used depends on the nature of the alkaline reagent. With pyridine and caustic soda low temperatures are preferred because of the improved yields which result. When calcium carbonate is used as the alkaline reagent, it is desirable to operate at elevated temperature, preferably above 50° C. The effect of the reduced yield is compensated by using an excess of both polyhydroxy compound and alkaline agent. The excess of the reagents may be recovered and used in subsequent preparations.

The esters may be recovered from the mixture by washing with water and/or dilute alkaline solutions to remove salts and other impurities. Thereafter, the esters may be treated with various agents to remove water, such as sodium sulphate, calcium chloride, etc.

The following examples are illustrative:

*Example I*

Phosgene was bubbled into a flask containing allyl alcohol at a rate of 20 millimoles per minute while agitating the mixture and cooling to a temperature below about 15 to 20° C. After phosgene in the proportion of about 0.9 moles of phosgene per mole of allyl alcohol had been introduced, the mixture was allowed to stand for one hour. Thereafter, the reaction mixture was washed with water to remove unreacted allyl alcohol and dried over calcium chloride. 2.2 moles of allyl chloroformate was added dropwise to a solution of 1 mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until the product was neutral. Thereafter, the product was washed with water and dried over calcium chloride. The ethylene glycol bis (allyl carbonate) having a boiling point of about 118–122° C. at 1 mm., an index of refraction of about $n_D^{20}$ 1.4443, a density $(d_4^{20})$ of about 1.114, and having the probable formula

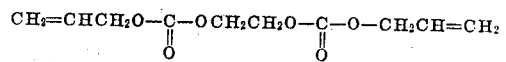

was obtained.

Example II

Phosgene was bubbled into a flask containing methallyl alcohol at a rate of 20 millimoles per minute while agitating the mixture and cooling to a temperature below about 10° C. After phosgene in the proportion of about 0.8 mole of phosgene per mole of methallyl alcohol had been introduced, the mixture was allowed to stand for one hour. Thereafter, the reaction mixture was washed with water and methallyl chloroformate was recovered. This compound had an index of refraction at 20° C. of 1.427 and a boiling point of approximately 130° C. at atmospheric pressure.

2.2 moles of methallyl chloroformate were added dropwise to a solution of one mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until the product was neutral. Thereafter, the product was recovered and dried over calcium chloride. The ethylene bis (methallyl carbonate) obtained was a colorless liquid which boiled at 142° C. at 2 mm. in a slow stream of carbon dioxide, and had a density of about 1.110 and an index of refraction ($n_D^{20}$) of about 1.4490. The probable formula of this compound was as follows

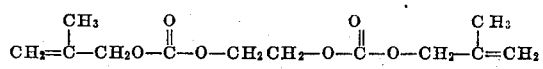

Example III 7.3 moles of allyl chloroformate were added dropwise to a solution of 3.3 moles of triethylene glycol in 8 moles of pyridine while cooling the reaction mixture to a temperature of 10 to 15° C. After the chloroformate had been added, the mixture was allowed to stand at room temperature for about an hour and the ester washed and recovered as in Example I. The triethylene bis (allyl carbonate) obtained was a colorless liquid which had an index of refraction ($n_D^{20}$) of 1.452 and a density of ($d_4^{20}$) of 1.135 and the probable formula of this compound was as follows

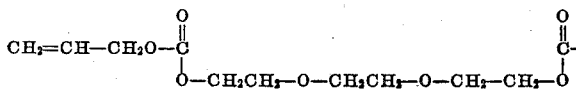

Example IV

The process described in Example I was repeated using an equivalent amount of tetraethylene glycol in lieu of ethylene glycol. The ester thus secured was a colorless liquid which had an index of refraction ($n_D^{20}$) of about 1.454, a density of 1.133 at 25° C. Polymerization of this material occurred when distillation was attempted at 2 mm. pressure.

Example V

The process described in Example I was repeated using an equivalent amount of diethylene glycol in lieu of ethylene glycol. The ester thus obtained was a colorless liquid which had an index of refraction of 1.449 at 20° C., a density of about 1.133 at 20° C./4° C. and a boiling point of about 166° C. at 2 mm. pressure.

Example VI

The process of Example IV was repeated using an equivalent amount of methallyl alcohol in lieu of allyl alcohol. The methallyl ester thus produced was a colorless high boiling liquid which polymerized when distillation at 2 mm. pressure was attempted.

Example VII

The process of Example III was repeated using an equivalent amount of methallyl alcohol in lieu of allyl alcohol. The triethylene glycol bis (methallyl carbonate) obtained was a colorless high boiling liquid which polymerized when distillation was attempted at 2 mm. pressure.

Example VIII

The process of Example V was repeated using an equivalent amount of methallyl alcohol in lieu of allyl alcohol. The diethylene glycol bis (methallyl carbonate) obtained was a colorless liquid having a refractive index at 20° C. of about 1.453, a density $$\left(\frac{20}{4}\right)$$

of about 1.114.

Example IX 7.2 moles of allyl choloroformate was added dropwise to a solution of 2 moles of glycerine in 7.8 moles of pyridine while cooling the reaction mixture to a temperature of 10 to 15° C. After the chloroformate had been added, the mixture was allowed to stand at room temeprature for about 45 minutes. The products were washed with water and recovered as in Example I. The glyceryl tri (allyl carbonate) thus obtained was a colorless liquid having an index of refraction ($n_D^{20}$) of about 1.4558, and a density $$\left(d_4^{20}\right)$$

of about 1.194. The probable formula of this compound is:

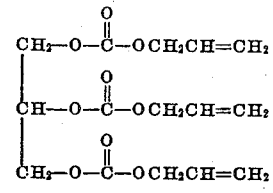

Example X 12.1 parts by weight of allyl chloroformate was slowly added to 16.4 parts by weight of castor oil in the presence of a large excess of pyridine. The product was washed successively with water, dilute hydrochloric acid, and then with water. Thereafter, the product was heated to 100° C. to remove volatile impurities. The product obtained was a liquid which was soluble in petroleum ether.

Example XI

A quantity of polyvinyl alcohol was dissolved by heating with about 10 times its weight of pyridine for 16 hours at 85° C. The solution was cooled to about 0° C. and mixed with cold allyl chloroformate while maintaining the temperature at 5 to 7° C. The mixture was stirred, warmed to 40° C. and poured into water slightly acidified with hydrochloric acid. A white sticky gum was precipitated. This gum dissolved, reprecipitated with water from acetone solution and a tough white polymer was obtained.

*Example XII*

The process of Example I was repeated using 2-chloroallyl alcohol in lieu of allyl alcohol and a colorless liquid, high-boiling liquid, which polymerized on distillation at a pressure of 2 mm. was obtained. This product polymerized in a manner similar to glycol di(allyl carbonate).

While the invention has been described with particular reference to chloroformates, it may also be applied to the preparation of carbonic esters from other haloformates such as the corresponding bromoformate.

Although the present invention has been described with reference to the specific details of certain embodiments thereof, it is not intended that such details shall be regarded as limitations upon the scope of the invention, except insofar as included in the accompanying claims.

This application is a continuation-in-part of copending application Serial No. 361,280, filed October 15, 1940.

We claim:

1. A method of preparing an ester of carbonic acid which comprises reacting an unsaturated haloformate with a polyhydric alcohol in the presence of a basic reagent.

2. A method of preparing an ester of carbonic acid which comprises reacting an unsaturated chloroformate with a polyhydric alcohol in the presence of a basic reagent.

3. A method of preparing an ester of carbonic acid which comprises reacting a chloroformate of a lower unsaturated alcohol containing up to 10 carbon atoms with a glycol in the presence of a basic reagent.

4. A method of preparing an ester of carbonic acid which comprises reacting a chloroformate of a lower unsaturated alcohol containing up to 10 carbon atoms with a polyglycol in the presence of a basic reagent.

5. A method of preparing an ester of carbonic acid which comprises reacting allyl chloroformate with a glycol in the presence of a basic reagent.

6. A method of preparing an ester of carbonic acid which comprises reacting methallyl chloroformate with a glycol in the presence of a basic reagent.

7. A method of preparing an ester of carbonic acid which comprises reacting methallyl chloroformate with a polyglycol in the presence of a basic reagent.

IRVING E. MUSKAT.
FRANKLIN STRAIN.